(12) United States Patent
Qin et al.

(10) Patent No.: US 10,317,748 B2
(45) Date of Patent: Jun. 11, 2019

(54) DISPLAY PANELS AND THE ARRAY SUBSTRATES THEREOF

(71) Applicant: Wuhan China Star Optoelectronics Technology Co., Ltd., Wuhan, Hubei (CN)

(72) Inventors: Jiehui Qin, Guangdong (CN); Cong Wang, Guangdong (CN); Xiaoping Tan, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 134 days.

(21) Appl. No.: 15/513,286

(22) PCT Filed: Feb. 22, 2017

(86) PCT No.: PCT/CN2017/074359
§ 371 (c)(1),
(2) Date: Mar. 22, 2017

(87) PCT Pub. No.: WO2018/120386
PCT Pub. Date: Jul. 5, 2018

(65) Prior Publication Data
US 2018/0231847 A1    Aug. 16, 2018

(30) Foreign Application Priority Data

Dec. 27, 2016  (CN) .......................... 2016 1 1226519
Jan. 22, 2017  (CN) .......................... 2017 1 0053935

(51) Int. Cl.
*G02F 1/136*    (2006.01)
*G02F 1/1343*   (2006.01)
*G02F 1/1362*   (2006.01)

(52) U.S. Cl.
CPC .. *G02F 1/134309* (2013.01); *G02F 1/136286* (2013.01); *G02F 2001/134345* (2013.01); *G02F 2201/40* (2013.01)

(58) Field of Classification Search
None
See application file for complete search history.

(56) References Cited

U.S. PATENT DOCUMENTS

2013/0083092 A1* 4/2013 Shin ..................... G09G 3/36
                                                  345/690
2016/0062177 A1* 3/2016 Park .................. G02F 1/133514
                                                  349/106

FOREIGN PATENT DOCUMENTS

| CN | 5252815 B2 | 4/2013 |
| CN | 203054413 U | 7/2013 |
| CN | 105185244 A | 12/2015 |

* cited by examiner

*Primary Examiner* — James A Dudek
(74) *Attorney, Agent, or Firm* — Andrew C. Cheng

(57) ABSTRACT

The present disclosure relates to a display panel and an array substrate including a plurality of pixel cells including colorful sub-pixels and one white sub-pixel. Each of the sub-pixels includes at least one sub-pixel electrode and at least one sub-pixel transistor corresponding to each of the sub-pixel electrode. The sub-pixel transistors are configured within the white sub-pixel to enhance an aperture rate of the colorful sub-pixels. As the sub-pixel transistors are configured within the same white sub-pixel, the brightness of the white sub-pixel may be decreased. At the same time, the aperture rate of the colorful sub-pixels may be greatly enhanced so as to enhance the performance of colorful images.

12 Claims, 4 Drawing Sheets

DISPLAY PANELS AND THE ARRAY SUBSTRATES THEREOF

BACKGROUND OF THE INVENTION

1. Field of the Invention

The present disclosure relates to display technology, and more particularly to a display panel and the array substrate thereof.

2. Discussion of the Related Art

With respect to liquid crystal panel technology, a white sub-pixel (W) is additionally configured in the RGBW pixel design when compared to the traditional RGB pixel design. With such configuration, the display brightness of the liquid crystal panel is increased, and the power consumption may be reduced, wherein when the R, G, and B sub-pixel of one pixel cell are turned on, the W sub-pixel is turned on. Otherwise, the W sub-pixel is in an off state.

Thus, when the RGBW display panel displays a pure-color or a colorful image, compared to the RGB liquid crystal panel, the pure-color brightness of the RGBW may be reduced when the background is the same. The displayed image may be distorted, which seriously affects the optical performance of the displayed image.

SUMMARY

The present disclosure relates to a display panel and the array substrate thereof to solve the issues of the RGBW display panel, including low brightness, distorted display images, and the poor optical performance.

In one aspect, an array substrate includes: a plurality of pixel cells including a plurality of colorful sub-pixels and one white sub-pixel, wherein each of the sub-pixels includes at least one sub-pixel electrode and at least one sub-pixel transistor corresponding to each of the sub-pixel electrode, the sub-pixel transistors is configured within the white sub-pixel to enhance an aperture rate of the colorful sub-pixels, with respect to the same pixel cell, the white sub-pixel is turned on when all of the colorful sub-pixels are turned on, and the colorful sub-pixels includes a red sub-pixel, a green sub-pixel, and a blue sub-pixel.

In another aspect, an array substrate includes: a plurality of pixel cells comprising a plurality of colorful sub-pixels and one white sub-pixel, wherein each of the sub-pixels comprises at least one sub-pixel electrode and at least one sub-pixel transistor corresponding to each of the sub-pixel electrode, and the sub-pixel transistors is configured within the white sub-pixel to enhance an aperture rate of the colorful sub-pixels.

Wherein with respect to the same pixel cell, the white sub-pixel is turned on when all of the colorful sub-pixels are turned on.

Wherein the pixel cells are arranged in a matrix, and the white sub-pixel is configured in any one of cells in the matrix.

Wherein the sub-pixel transistors within the white sub-pixel also includes at least one virtual sub-pixel transistor.

Wherein the sub-pixel transistors is a thin film transistor (TFT), a first connecting end, a second connecting end, and a control end of the sub-pixel transistor respectively corresponds to a drain, a source, and a gate of the TFT.

Wherein the array substrate further includes a plurality of scanning lines and a plurality of data lines, wherein the first connecting end of each of the sub-pixel transistors within each of the pixel cells connects to the corresponding sub-pixel electrode, the second connecting end of each of the sub-pixel transistors within each of the pixel cells connects to the corresponding data line, and the control end of each of the sub-pixel transistors within each of the pixel cells connects to the corresponding scanning line.

Wherein the colorful sub-pixels includes a red sub-pixel, a green sub-pixel, and a blue sub-pixel.

In another aspect, a display panel includes: the above array substrate, a common substrate opposite to the array substrate, and a liquid crystal layer between the array substrate and the common substrate.

Wherein with respect to the same pixel cell, the white sub-pixel is turned on when all of the colorful sub-pixels are turned on, and the colorful sub-pixels includes a red sub-pixel, a green sub-pixel, and a blue sub-pixel.

Wherein the pixel cells are arranged in a matrix, and the white sub-pixel is configured in any one of cells in the matrix.

Wherein the sub-pixel transistors within the white sub-pixel also includes at least one virtual sub-pixel transistor.

Wherein the sub-pixel transistors is a thin film transistor (TFT), a first connecting end, a second connecting end, and a control end of the sub-pixel transistor respectively corresponds to a drain, a source, and a gate of the TFT.

Wherein the array substrate further includes a plurality of scanning lines and a plurality of data lines, wherein the first connecting end of each of the sub-pixel transistors within each of the pixel cells connects to the corresponding sub-pixel electrode, the second connecting end of each of the sub-pixel transistors within each of the pixel cells connects to the corresponding data line, and the control end of each of the sub-pixel transistors within each of the pixel cells connects to the corresponding scanning line.

Wherein the colorful sub-pixels includes a red sub-pixel, a green sub-pixel, and a blue sub-pixel.

In view of the above, as the sub-pixel transistors are configured within the same white sub-pixel, the brightness of the white sub-pixel may be decreased. At the same time, the aperture rate of the colorful sub-pixels may be greatly enhanced so as to enhance the performance of colorful images.

BRIEF DESCRIPTION OF THE DRAWINGS

Embodiments of the invention will now be described more fully hereinafter with reference to the accompanying drawings, in which embodiments of the invention are shown. Apparently, the accompanying drawings are only some embodiments of the claimed invention. Those of ordinary skill can derive other drawings from these drawings without creative efforts.

DETAILED DESCRIPTION OF THE EMBODIMENTS

Embodiments of the invention will now be described more fully hereinafter with reference to the accompanying drawings, in which embodiments of the invention are shown.

Figure 1:
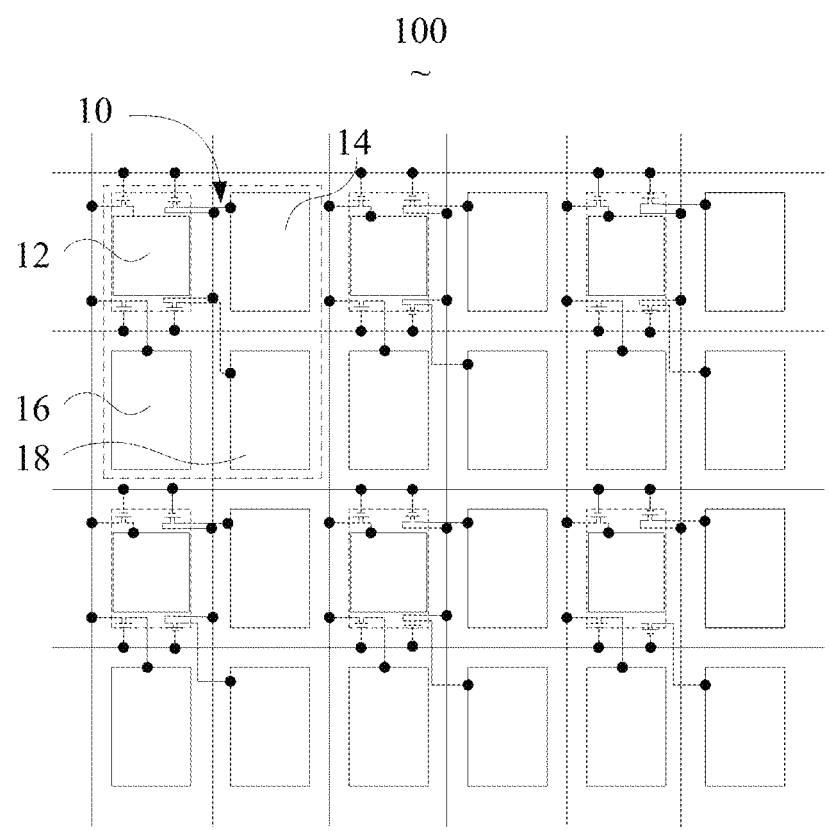
FIG. 1 is a schematic view of the array substrate in accordance with one embodiment.
Figure 2:
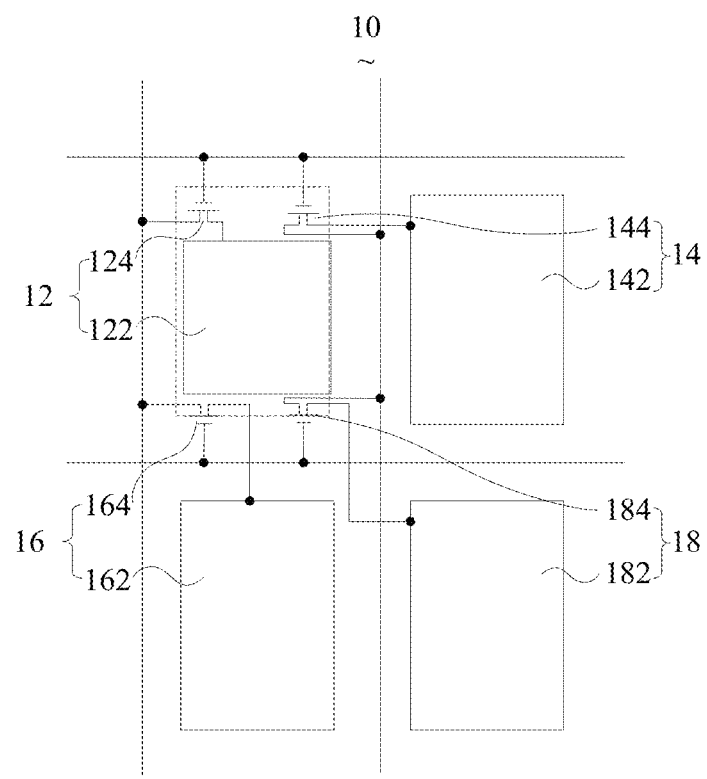
FIG. 2 is a schematic view of the pixel cell in the first embodiment.

FIG. 1 is a schematic view of the array substrate in accordance with one embodiment. FIG. 2 is a schematic view of the pixel cell in the first embodiment.

As shown in FIG. 1, the array substrate 100 includes a plurality of pixel cells 10, each of the pixel cells 10 includes a plurality of colorful sub-pixels and one white sub-pixel 12, the colorful sub-pixels are respectively a red sub-pixel 14, a green sub-pixel 16, and a blue sub-pixel 18. Each of the sub-pixels includes at least one sub-pixel electrode and at least one sub-pixel transistor corresponding to each of the sub-pixel electrode. The sub-pixel transistors are configured within the white sub-pixel 12 to enhance the aperture rate of the colorful sub-pixel.

The array substrate 100 is configured with the sub-pixel transistor, and the sub-pixel transistors are configured within the white sub-pixel 12 so as to decrease the brightness of the white sub-pixel 12 and to increase the aperture rate of the colorful sub-pixel. Thus, the distortion of the colorful image may be reduced such that optical performance of the colorful image may be enhanced.

Referring to FIG. 2, each of the sub-pixels includes the sub-pixel transistor and the sub-pixel transistor is configured in accordance with each of the sub-pixel electrodes. The white sub-pixel 12 includes a white sub-pixel electrode 122 and a white sub-pixel transistor 124 corresponding to the white sub-pixel electrode 122. The red sub-pixel 14 includes a red sub-pixel 142 and a red sub-pixel transistor 144 corresponding to the red sub-pixel 142. The green sub-pixel 16 includes a green sub-pixel electrode 162 and a green sub-pixel transistor 164 corresponding to the green sub-pixel electrode 162. The blue sub-pixel 18 includes a blue sub-pixel electrode 182 and a blue sub-pixel transistor 184 corresponding to the blue sub-pixel electrode 182. Wherein the white sub-pixel transistor 124, the red sub-pixel transistor 144, the green sub-pixel transistor 164, and the blue sub-pixel transistor 184 are configured within the white sub-pixel 12.

The pixel cells 10 are arranged in a matrix, the white sub-pixel 12 may be arranged in any one of the cells in the matrix. Specifically, the pixel cells 10 are arranged in a square-shaped configuration including 2×2 grids, and the white sub-pixel 12 is configured in any one of the cells in the square-shaped pixel cell 10. In one example, the white sub-pixel 12 is arranged in a top-left cell of the square-shaped configuration. In another example, the white sub-pixel 12 is arranged in a down-left, top-right, or down-right cell of the square-shaped configuration. The pixel cells may be arranged in a dash-shaped configuration or a pipe-shaped configuration. That is, the sub-pixels are arranged in one column or in one column, and the white sub-pixel is arranged in one of the cell as long as the sub-pixel transistor is configured within the white sub-pixel.

With respect to the same pixel cell 10, the white sub-pixel 12 is only turned on when the red sub-pixel 14, the green sub-pixel 16, and the blue sub-pixel 18 are turned on. Due to the white sub-pixel 12, the brightness of the displayed image may be greatly enhanced while the power consumption may be lower or the same. When the pure-color image or the display image having only two colors, the white sub-pixel 12 is not turned on for the reason that the white sub-pixel 12 may affect the color purity of the displayed image, which results in color distortion. Thus, within the same pixel cell, the white sub-pixel may be turned on only when the colorful sub-pixels are turned on.

Figure 3:
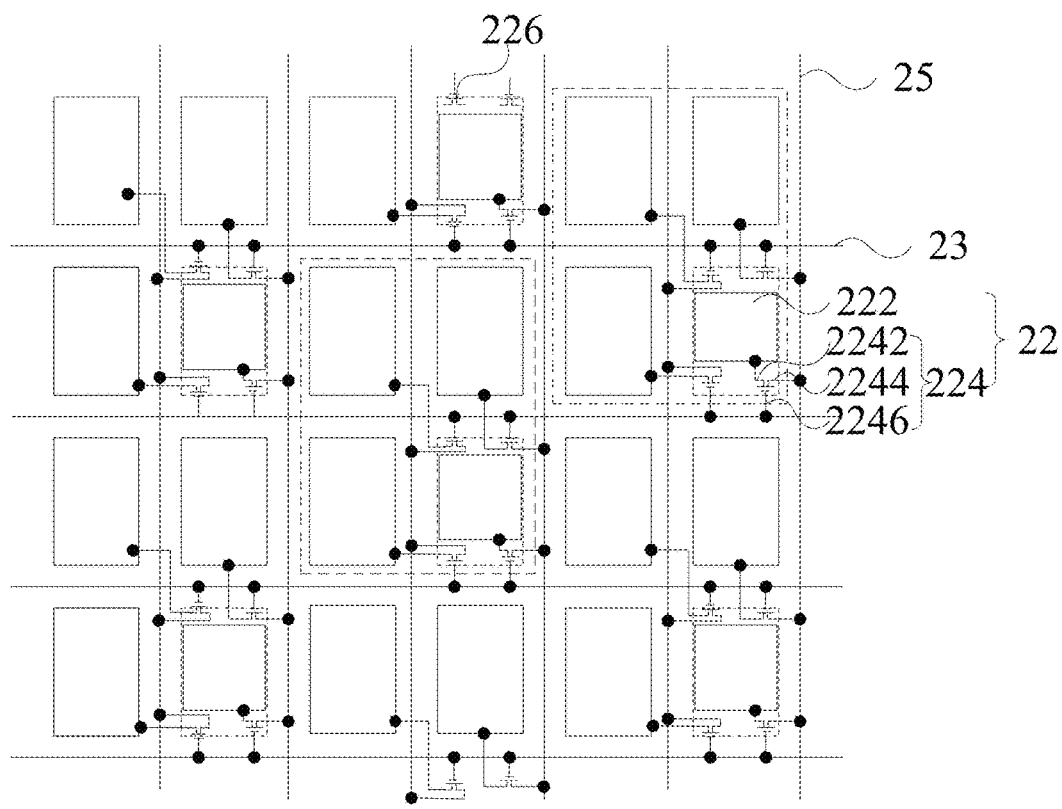
FIG. 3 is a schematic view of the array substrate in accordance with a second embodiment.

FIG. 3 is a schematic view of the array substrate in accordance with a second embodiment.

In the embodiment, the sub-pixel transistors are thin film transistors (TFTs), a first connecting end, a second connecting end, and a control end of the sub-pixel transistors respectively correspond to a drain, a source, and a gate of the TFT. Specifically, taking the sub-pixel transistor 224 of the secondary lens 22 as one example, the sub-pixel transistor 224 is the TFT, the first connecting end 2242, the second connecting end 2244, and the control end 2246 of the sub-pixel transistor 224 respectively correspond to the drain, the source, and the gate of the TFT. The sub-pixel transistors of other colorful sub-pixels may be configured in a similar way. The sub-pixel transistor 224 of the secondary lens 22 will be taken as one example in the below.

As shown in FIG. 3, the signal controller 200 further includes a plurality of scanning lines 23 and a plurality of data lines 25, wherein the first connecting end 2242 of each of the sub-pixels within each of the pixel cells connects to the corresponding sub-pixel electrode 222, the second connecting end 2244 of each of the sub-pixels within each of the pixel cells connects to the corresponding data lines 25, and the control end 2246 of each of the sub-pixels within each of the pixel cells connects to the corresponding scanning lines 23.

With respect to the configuration of the signal controller 200, the sub-pixel transistors within the white sub-pixel 22 also includes at least one virtual sub-pixel transistor 226. Currently, the display panel are designed to have an even number of columns. In the embodiments, the first column and the latest column have to be specially configured. When there are no other sub-pixels configured above the white sub-pixel 22 corresponding to the first column, only two TFTs are required for the sub-pixel in the left side and the white sub-pixel 22. To keep the aperture rate of the white sub-pixel 22 the same, two virtual sub-pixel transistors 226 are configured for the white sub-pixel 22 in the first column, wherein the virtual sub-pixel transistor 226 do not operate itself. When there are no other sub-pixels configured below the white sub-pixel 22 corresponding to the latest column, to keep the aperture rate of the white sub-pixel 22 the same, the TFT of the sub-pixel corresponding to the latest column is configured to be below the display area of the sub-pixel.

The array substrate 200 may be implemented without changing the wiring configuration. Not only the parasitic capacitance between the sub-pixels may be effectively decreased, the aperture rates of the R, G, and B sub-pixels may be greatly increased. Thus, the distortion regarding the pure-color or colorful images displayed by the RGBW configuration may be enhanced, and the brightness of the display panel may not be affected.

The sub-pixel transistors are TFTs. When the TFTs are configured within the colorful sub-pixels, the TFTs do not emit lights. Thus, the aperture rate of the colorful sub-pixels may loss to some extent. In view of the above, the sub-pixel transistors of the pixel cell is configured within the same white sub-pixel, which greatly increases the aperture rate of the colorful sub-pixel, i.e., the aperture rate is increased from 50% to 70%. The corresponding aperture rate of the white sub-pixel is decreased, which results in a lower brightness of the white sub-pixel. Also, the impact from the white light beams to the colorful images may be reduced so as to enhance the performance of the colorful images.

Figure 4:
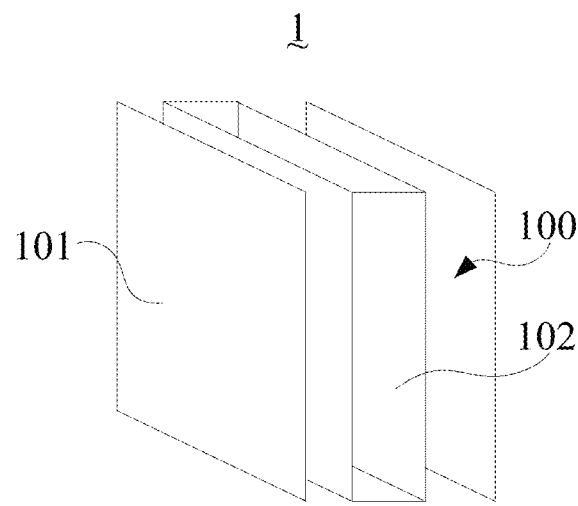
FIG. 4 is a schematic view of the display panel in accordance with the first embodiment.

FIG. 4 is a schematic view of the display panel in accordance with the first embodiment.

As shown in FIG. 4, the display panel 1 includes the array substrate 100, the common substrate 101 opposite to the array substrate 100, and a liquid crystal layer 102 between the array substrate and the common substrate.

Wherein the structure of the array substrate 100 may be reference in the above disclosure, and thus are omitted hereinafter.

Figure 5:
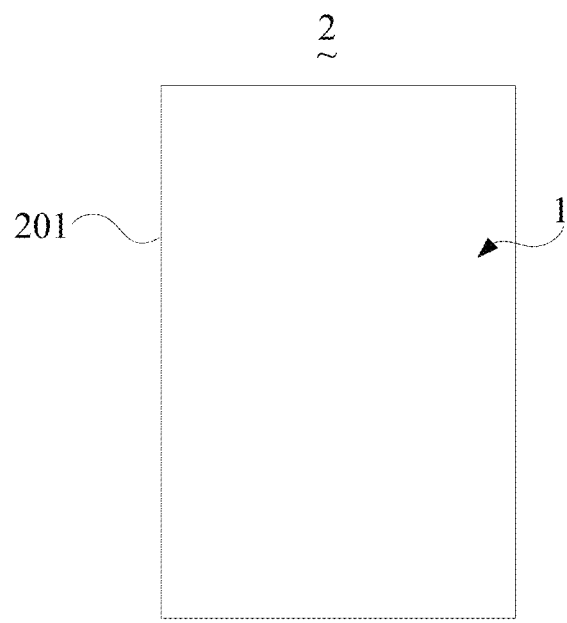
FIG. 5 is a schematic view of the display device in accordance with the first embodiment.

FIG. 5 is a schematic view of the display device in accordance with the first embodiment.

As shown in FIG. 5, a display device 2 including a housing 201 and the above display panel 1, and the display panel 1 is arranged within the housing 201.

The structures of the scanning driving circuit 1 and the array substrate 300 may be referred to the above disclosure, and thus are omitted hereinafter.

In view of the above, the array substrate is configured with the sub-pixel transistor, and the sub-pixel transistors are configured within the white sub-pixel so as to decrease the brightness of the white sub-pixel and to increase the aperture rate of the colorful sub-pixel. Thus, the distortion of the colorful image may be reduced such that optical performance of the colorful image may be enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate, comprising:
a plurality of pixel cells comprising a plurality of colorful sub-pixels and one white sub-pixel, wherein each of the sub-pixels comprises at least one sub-pixel electrode and at least one sub-pixel transistor corresponding to each of the sub-pixel electrode, and the sub-pixel transistors is configured within the white sub-pixel to enhance an aperture rate of the colorful sub-pixels wherein the sub-pixel transistors within the white sub-pixel also comprises at least one virtual sub-pixel transistor configured to keep an aperture ratio of the white sub-pixel the same.

2. The array substrate as claimed in claim 1, wherein with respect to the same pixel cell, the white sub-pixel is turned on when all of the colorful sub-pixels are turned on.

3. The array substrate as claimed in claim 2, wherein the pixel cells are arranged in a matrix, and the white sub-pixel is configured in any one of cells in the matrix.

4. The array substrate as claimed in claim 1, wherein the sub-pixel transistors is a thin film transistor (TFT), a first connecting end, a second connecting end, and a control end of the sub-pixel transistor respectively corresponds to a drain, a source, and a gate of the TFT.

5. The array substrate as claimed in claim 4, wherein the array substrate further comprises a plurality of scanning lines and a plurality of data lines, wherein the first connecting end of each of the sub-pixels within each of the pixel cells connects to the corresponding sub-pixel electrode, the second connecting end of each of the sub-pixels within each of the pixel cells connects to the corresponding data line, and the control end of each of the sub-pixels within each of the pixel cells connects to the corresponding scanning line.

6. The array substrate as claimed in claim 3, wherein the colorful sub-pixels comprising a red sub-pixel, a green sub-pixel, and a blue sub-pixel.

7. A display panel, comprising:
the array substrate as claimed in claim 1, a common substrate opposite to the array substrate, and a liquid crystal layer between the array substrate and the common substrate.

8. The display panel as claimed in claim 7, wherein with respect to the same pixel cell, the white sub-pixel being turned on when all of the colorful sub-pixels are turned on, and the colorful sub-pixels comprising a red sub-pixel, a green sub-pixel, and a blue sub-pixel.

9. The display panel as claimed in claim 8, wherein the pixel cells are arranged in a matrix, and the white sub-pixel is configured in any one of cells in the matrix.

10. The display panel as claimed in claim 7, wherein the sub-pixel transistors is a thin film transistor (TFT), a first connecting end, a second connecting end, and a control end of the sub-pixel transistor respectively corresponds to a drain, a source, and a gate of the TFT.

11. The display panel as claimed in claim 10, wherein the array substrate further comprises a plurality of scanning lines and a plurality of data lines, wherein the first connecting end of each of the sub-pixels within each of the pixel cells connects to the corresponding sub-pixel electrode, the second connecting end of each of the sub-pixels within each of the pixel cells connects to the corresponding data line, and the control end of each of the sub-pixels within each of the pixel cells connects to the corresponding scanning line.

12. The display panel as claimed in claim 7, wherein the colorful sub-pixels comprising a red sub-pixel, a green sub-pixel, and a blue sub-pixel.

* * * * *